United States Patent
Kasada

(10) Patent No.: US 8,841,009 B2
(45) Date of Patent: Sep. 23, 2014

(54) MAGNETIC TAPE AND MAGNETIC RECORDING DEVICE

(75) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 108 days.

(21) Appl. No.: 13/556,609

(22) Filed: Jul. 24, 2012

(65) Prior Publication Data

US 2013/0027808 A1    Jan. 31, 2013

(30) Foreign Application Priority Data

Jul. 25, 2011 (JP) .................................. 2011-162290

(51) Int. Cl.
| | | |
|---|---|---|
| G11B 5/708 | (2006.01) | |
| B82Y 10/00 | (2011.01) | |
| G11B 5/70 | (2006.01) | |
| G11B 5/706 | (2006.01) | |
| H01F 1/117 | (2006.01) | |
| B82Y 30/00 | (2011.01) | |

(52) U.S. Cl.
CPC . *G11B 5/70* (2013.01); *B82Y 10/00* (2013.01); *G11B 5/70678* (2013.01); *H01F 1/117* (2013.01); *G11B 5/7013* (2013.01); *B82Y 30/00* (2013.01)
USPC ........................................................ 428/842.8

(58) Field of Classification Search
None
See application file for complete search history.

(56) References Cited

U.S. PATENT DOCUMENTS

| | | | |
|---|---|---|---|
| 4,435,485 A * | 3/1984 | Nakajima et al. ........... 428/844.6 |
| 5,378,547 A | 1/1995 | Kubo et al. | |
| 5,494,749 A | 2/1996 | Kubo et al. | |
| 6,689,455 B2 | 2/2004 | Masaki | |
| 6,991,862 B2 | 1/2006 | Ohno et al. | |
| 2003/0049490 A1 | 3/2003 | Masaki | |
| 2004/0219393 A1 | 11/2004 | Ohno et al. | |
| 2009/0087684 A1* | 4/2009 | Omura et al. ................. 428/800 |
| 2009/0098414 A1 | 4/2009 | Ooishi et al. | |

FOREIGN PATENT DOCUMENTS

| | | |
|---|---|---|
| JP | 04-178916 A | 6/1992 |
| JP | 05-144615 A | 6/1993 |
| JP | 05-283218 A | 10/1993 |
| JP | 07-057242 A | 3/1995 |
| JP | 08-106622 A | 4/1996 |
| JP | 08-129741 A | 5/1996 |
| JP | 09-161259 A | 6/1997 |
| JP | 2002-260212 A | 9/2002 |
| JP | 2002-298333 A | 10/2002 |
| JP | 2002-329309 A | 11/2002 |
| JP | 2002-342913 A | 11/2002 |
| JP | 2002-373413 A | 12/2002 |
| JP | 2004-319001 A | 11/2004 |
| JP | 2005-243162 A | 9/2005 |
| JP | 2009-099240 A | 5/2009 |

OTHER PUBLICATIONS

Decision to Grant a Patent dated Oct. 8, 2013 in Japanese Application No. 2011-162290.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a magnetic tape comprising a magnetic layer containing a hexagonal ferrite magnetic powder and a binder on a nonmagnetic support, wherein a standard deviation $\sigma Hk$ of a magnetic anisotropy constant Hk of the magnetic layer is equal to or less than 30%, and a magnetic interaction $\Delta M$ as calculated by equation (1) below falls within a range of $-0.20 \leq \Delta M \leq -0.03$: $\Delta M=(Id(H)+2Ir(H)-Ir(\infty))/Ir(\infty)$ ... (1) wherein $Id(H)$ denotes a residual magnetization measured with DC demagnetization, $Ir(H)$ denotes a residual magnetization measured with AC demagnetization, and $Ir(\infty)$ denotes a residual magnetization measured at an applied magnetic field of 796 kA/m.

20 Claims, No Drawings

MAGNETIC TAPE AND MAGNETIC RECORDING DEVICE

CROSS-REFERENCE TO RELATED APPLICATIONS

This application claims the benefit of priority under 35 USC 119 to Japanese Patent Application No. 2011-162290 filed on Jul. 25, 2011, which is expressly incorporated herein by reference in its entirety.

BACKGROUND OF THE INVENTION

1. Field of the Invention

The present invention relates to a magnetic tape and a magnetic recording device comprising the same. More particularly, it relates to a magnetic tape affording good electromagnetic characteristics, good running durability and good running stability, and to a magnetic recording device comprising the same.

2. Discussion of the Background

As the quantity of recorded information has increased, ever higher recording densities have been demanded of magnetic recording media. Accordingly, to achieve high-density recording, the practice of increasing the fill rate of the magnetic layer by using microparticulate magnetic powders has been widely employed.

Conventionally, primarily ferromagnetic metal magnetic particles have come to be employed in the magnetic layer of magnetic recording media for high-density recording. However, a limit has begun to appear in the improvement of ferromagnetic metal magnetic particles to achieve higher density recording. By contrast, the coercive force of hexagonal ferrite magnetic particles is great enough for them to be used in permanent magnetic materials. Their magnetic anisotropy, which is the basis of this coercive force, derives from their crystalline structure. Thus, it is possible to maintain the coercive force even when the particles are reduced in size. Further, magnetic recording media with magnetic layers in which hexagonal ferrite magnetic particles are employed can exhibit high-density characteristics based on the vertical component. Thus, hexagonal ferrite magnetic particles are a ferromagnetic magnetic material that is suited to achieving higher densities.

However, since hexagonal ferrite magnetic materials are tabular in form, in contrast to ferromagnetic magnetic particles, which are acicular in form, and since they have an easily magnetized axis in a direction perpendicular to the tabular surface thereof, they tend to undergo stacking (a state where the magnetic particles aggregate like the beads of an abacus). When the magnetic particles aggregate, a state similar to that of coarse particles being present in the magnetic layer is created, even with microparticles. The noise increases, causing the SNR to drop. As a countermeasure, attempts have been made to prevent aggregation (stacking) of the particles by increasing the dispersion of hexagonal ferrite. In this context, reference can be made to Japanese Unexamined Patent Publication (KOKAI) Heisei No. 4-178916 (Reference 1), Japanese Unexamined Patent Publication (KOKAI) Heisei No. 5-283218 (Reference 2), Japanese Unexamined Patent Publication (KOKAI) Heisei No. 5-144615 (Reference 3) or English language family members U.S. Pat. Nos. 5,378,547 and 5,494,749, Japanese Unexamined Patent Publication (KOKAI) No. 2002-298333 (Reference 4) or English language family members US 2003/049490A1 and U.S. Pat. No. 6,689,455 B2, and Japanese Unexamined Patent Publication (KOKAI) No. 2009-099240 (Reference 5) or English language family member US 2009/098414 A1, and Japanese Unexamined Patent Publication (KOKAI) No. 2002-373413 (Reference 6), which are expressly incorporated herein by reference in their entirety.

Further, when the particle size of the magnetic particles is reduced, running durability decreases (the output fluctuates with repeated running) and running stability deteriorates. These are thought to be caused by a drop in the film strength due to a reduction in the size of the magnetic particles. Such phenomena should be avoided, particularly in data backup tapes that are required to maintain high reliability for long periods. Accordingly, various investigation has been conducted into improving the running durability and the like of magnetic recording media. For example, the control of protrusions (see Japanese Unexamined Patent Publication (KOKAI) No. 2005-243162 (Reference 7), which is expressly incorporated herein by reference in its entirety) by means of abrasives, the use of binder of high Tg (see Japanese Unexamined Patent Publication (KOKAI) No. 2004-319001 (Reference 8) or English language family member US2004/219393 A1 or U.S. Pat. No. 6,991,862 B2, which are expressly incorporated herein by reference in their entirety), and the like have been proposed.

SUMMARY OF THE INVENTION

As set forth above, it is demanded for magnetic recording media for high-density recording to increase the SNR as well as to ensure running durability and stability.

Accordingly, the present invention provides for a magnetic recording medium capable of achieving high running durability, stability, and a high SNR.

The present inventor conducted extensive research, resulting in the following discoveries.

(1) The need to suppress aggregation (stacking) to enhance the SNR is common technical knowledge in the field of magnetic recording media containing ferromagnetic powder in the form of hexagonal ferrite powder. For example, above References 1 to 6 propose the suppression of aggregation (stacking).

By contrast, the present inventor arrived at the conventionally unknown, new knowledge that running stability and durability could be ensured and a good SNR could be maintained by causing hexagonal ferrite magnetic particles to suitably stack so as to align in the direction of thickness of the tape in a magnetic tape. The present inventor attributed this to the hexagonal ferrite magnetic particles that aligned in the direction of thickness of the tape undergoing little magnetic interaction between particles in the longitudinal direction of the tape, resulting in low spreading of noise components during recording and thus resulting in the maintenance of a good SNR. Additionally, they presumed that since the magnetic interaction between particles in the direction of thickness of the tape was strong, film strength was enhanced. As is described in References 7 and 8, the conventional means of enhancing running durability is to adopt an approach of applying magnetic layer components (abrasives, binders) other than magnetic powder. The present inventor discovered for the first time ever the fact that running durability and the like could be improved by countermeasures based on magnetic powder.

(2) Additionally, the present inventor presumed a mechanism that was not based on the magnetic characteristics of the magnetic layer themselves, but on a high degree of control of the distribution of the magnetic characteristics that resulted in an improved SNR. Through extensive trial and error based on this presumed mechanism, he discovered that the SNR could be enhanced by controlling the standard deviation σHk of the magnetic anisotropy constant Hk in a magnetic layer to which the countermeasures based on the knowledge of (1) above had been applied. The switching field distribution (SFD) has primarily been employed as an index of the distribution of the magnetic characteristics of the magnetic layer. However, since a good correlation has not necessarily been achieved between the SFD and the SNR, the present inventor conducted extensive further research. As a result, he discovered that it was possible to enhance the SNR by controlling the distribution of the magnetic characteristics in the magnetic layer by the standard deviation σHk of the Hk.

Based on the above discoveries, the present inventor conducted extensive further research. The present invention was devised on that basis.

An aspect of the present invention relates to a magnetic tape comprising a magnetic layer containing a hexagonal ferrite magnetic powder and a binder on a nonmagnetic support, wherein a standard deviation σHk of a magnetic anisotropy constant Hk of the magnetic layer is equal to or less than 30%, and a magnetic interaction $\Delta M$ as calculated by equation (1) below falls within a range of $-0.20 \leq \Delta M \leq -0.03$:

$$\Delta M = (Id(H) + 2Ir(H) - Ir(\infty))/Ir(\infty) \quad (1)$$

wherein Id(H) denotes a residual magnetization measured with DC demagnetization, Ir(H) denotes a residual magnetization measured with AC demagnetization, and Ir($\infty$) denotes a residual magnetization measured at an applied magnetic field of 796 kA/m, approximately 10 kOe.

In an embodiment, the above magnetic tape is a longitudinal recording magnetic tape.

In an embodiment, the above magnetic tape further comprises a dispersing agent in the form of an aromatic compound comprising at least one polar group selected from the group consisting of a carboxyl group and a hydroxyl group.

In an embodiment, the above aromatic compound comprises an aromatic ring directly substituted with the polar group.

In an embodiment, the above aromatic compound is selected from the group consisting of dihydroxynaphthalene and biphenyl benzoic acid.

In an embodiment, the standard deviation σHk of a magnetic anisotropy constant Hk of the magnetic layer is equal to or less than 15%.

In an embodiment, the magnetic interaction $\Delta M$ falls within a range of $-0.20 \leq \Delta M \leq -0.10$.

In an embodiment, the magnetic layer comprises a hexagonal ferrite magnetic powder with an average plate diameter ranging from 10 nm to 30 nm.

A further aspect of the present invention relates to a magnetic recording device comprising the above magnetic tape and a longitudinal recording magnetic head.

The present invention can provide a magnetic tape for high-density recording having good running durability and stability.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to a magnetic tape comprising a magnetic layer containing a hexagonal ferrite magnetic powder and a binder on a nonmagnetic support. In the magnetic tape of the present invention, the standard deviation σHk of a magnetic anisotropy constant Hk of the magnetic layer is equal to or less than 30%, and the magnetic interaction $\Delta M$ as calculated by equation (1) below falls within a range of $-0.20 \leq \Delta M \leq -0.03$.

$$\Delta M = (Id(H) + 2Ir(H) - Ir(\infty))/Ir(\infty) \quad (1)$$

In equation (1), Id(H) denotes a residual magnetization measured with DC demagnetization, Ir(H) denotes a residual magnetization measured with AC demagnetization, and Ir($\infty$) denotes a residual magnetization measured at an applied magnetic field of 796 kA/m, approximately 10 kOe.

As set forth in detail below, $\Delta M$ is an index indicating the stacking state. As set forth above, a good SNR can be maintained as well as running durability and stability can be ensured by causing hexagonal ferrite magnetic particles to suitably stack so as to align in the direction of thickness of the tape in a magnetic tape. Additionally, σHk has not conventionally been employed as an index indicating the distribution of the magnetic characteristics of the magnetic layer. By contrast, a good SNR can be achieved by controlling σHk to equal to or less than 30% in the present invention.

The magnetic tape of the present invention will be described in greater detail below.

As set forth above, one of the reasons that the SNR, running durability, and stability can be simultaneously enhanced in the present invention is that the particles of hexagonal ferrite powder are caused to stack so as to align in the direction of thickness of the tape. In the present invention, the magnetic interaction ΔM calculated by equation (1) below is employed as an index of the stacking state.

$$\Delta M=(Id(H)+2Ir(H)-Ir(\infty))/Ir(\infty) \quad (1)$$

In equation (1), Id(H) denotes the residual magnetization measured with DC demagnetization, Ir(H) denotes the residual magnetization measured with AC demagnetization, and Ir(∞) denotes the residual magnetization at an applied magnetic field of 796 kA/m, approximately 10 kOe. ΔM is the difference between the AC remanence from an AC demagnetization state and the DC remanence from a DC demagnetization state as obtained from a remanence curve. It assumes a positive value when the interaction between magnetic particles in the longitudinal direction of the tape (running direction) is stronger than their interaction in the thickness direction of the tape, and a negative value when the opposite applies. The greater the absolute value, the stronger the interaction between the magnetic particles in the particular direction, that is, the more intense the degree of alignment in the particular direction. In the present invention, the interaction between magnetic particles in the direction of thickness of the tape is rendered stronger than that in the longitudinal direction of the tape by causing the hexagonal ferrite magnetic particles to stack in the direction of thickness of the tape, so ΔM assumes a negative value. By imparting ΔM with a negative value having an absolute value of equal to or higher than 0.03, (that is, ΔM≤−0.03), it is possible to ensure running stability and a running durability that can withstand repeated running. That is thought to be because the film strength can be enhanced by the strong interaction between the magnetic particles. However, when the negative value of ΔM is such that the absolute value exceeds 0.20, the magnetic interaction between magnetic particles becomes excessively strong, the effective magnetization switching volume increases, noise increases, and it becomes difficult to ensure a good SNR. For these reasons, ΔM is specified to within the range of −0.20≤ΔM≤−0.03, desirably within the range of −0.20≤ΔM≤−0.10, in the present invention.

As set forth above, the ΔM of the magnetic layer indicates the degree of alignment (stacking state) of hexagonal ferrite magnetic particles in the magnetic layer. Examples of factors affecting the stacking state are the fill rate of hexagonal ferrite magnetic particles in the magnetic layer, dispersion processing, and orientation processing. By subjecting the magnetic layer to vertical orientation processing while it is still in a wet state with hexagonal ferrite magnetic particles highly dispersed at a prescribed density, it is possible to cause the magnetic particles to align in the direction of thickness of the tape. Accordingly, in the present invention, it is possible to keep the ΔM of the magnetic layer to within the above range by means of the fill rate of hexagonal magnetic particles in the magnetic layer, dispersion processing, and orientation processing. These factors will be described in greater detail below.

The fill rate of hexagonal ferrite magnetic particles in the magnetic layer is desirably 30% to 60% from the perspective of readily achieving a desired ΔM.

From the perspective of readily achieving a desired ΔM, in the magnetic layer coating liquid, it is desirable to achieve a dispersion state such that the dispersed particle diameter that is measured in Examples set forth further below is 20 nm to 50 nm. Intensifying the dispersion processing conditions is an example of a means of achieving such high dispersion conditions. The details of dispersion processing will be set forth further below. Another means is to employ one dispersing agent, or a combination of two or more dispersing agents as additives in the magnetic layer. Examples of dispersing agents that are desirable in terms of achieving a desired ΔM are aromatic compounds having at least one polar group selected from the group consisting of carboxyl groups and hydroxyl groups. The aromatic compound employed is preferably one with a compound in which the polar group is directly substituted onto the aromatic ring. In the above aromatic compound, the polar group can adsorb onto the surface of the hexagonal ferrite magnetic particles, making it possible to prevent the particles from coming into direct contact with each other and aggregating. Further, the strength of adsorption to the hexagonal ferrite magnetic particle is suitable, so the alignment in the direction of thickness of the tape due to the magnetic interaction of the particles during vertical orientation processing is not hindered. The mutual attraction of the aromatic rings (π-π interaction) is presumed to promote the alignment. The above aromatic compound is desirably not a polymer in which, for example, five or more aromatic rings are linked through linking groups. That is because polymers present the possibility of inhibiting stacking of the hexagonal ferrite magnetic particles due to steric hindrance.

So long as the ring structure contained in the above aromatic compound is an aromatic ring, it can be a monocyclic structure or a polycyclic structure, and a carbon ring or a hetero ring. When a polycyclic structure, it can be a condensed ring or a ring set in which two or more rings are linked by single bonds or linking groups. Specific examples of the ring structure are: naphthalene rings, biphenyl rings, anthracene rings, pyrene rings, and phenanthrene rings. Desirable examples of ring structures are naphthalene rings, biphenyl rings, anthracene rings, and pyrene rings. Naphthalene rings are preferred.

Since the aromatic compound comprises a polar group selected from the group consisting of carboxyl groups and hydroxyl groups, it can suitably adsorb to the hexagonal ferrite magnetic particles, inhibiting aggregation. In compounds having substituents in the form of functional groups with great adsorptive strength, such as sulfonic acid groups and their salts, the strength of adsorption to the hexagonal ferrite magnetic particles is excessive, resulting in the possibility that the alignment of the magnetic particles in the direction of thickness of the tape will be impeded during vertical orientation processing. It suffices for the compound to contain at least one polar group described above, with two, three, or more also being possible. One or two such groups are desirable to develop suitable adsorptive strength.

The compound can contain substituents in addition to the above polar group. The additional substituents are not specifically limited. Examples are halogen atoms (such as fluorine atoms, chlorine atoms, bromine atoms, and iodine atoms), alkyl groups, and aryl groups. However, for the reasons set forth above, the presence of substituents exhibiting greater adsorption to the magnetic particles than a hydroxyl group or carboxyl group is undesirable.

Examples of dispersing agents that are particularly desirable from the above perspectives are hydroxynaphthalene, dihydroxynaphthalene, benzoic acid, and biphenyl benzoic acid. Examples of optimal compounds are dihydroxynaphthalene and biphenyl benzoic acid. From the perspective of readily achieving a desired ΔM, the dispersing agent is desirably employed in a quantity of 1 to 20 weight parts, preferably 1 to 10 weight parts, and more preferably, 5 to 10 weight parts per 100 parts of hexagonal ferrite powder.

Further, during preparation of the magnetic layer coating liquid, the dispersing agent is subjected to dispersion processing in an organic solvent with the hexagonal ferrite powder and binder. The mixing order can consist of: (a) adding the dispersing agent to the organic solvent roughly simultaneously with the hexagonal ferrite powder and binder; (b) premixing the dispersing agent with the hexagonal ferrite powder, conducting dispersion processing, and then adding the binder; and (c) premixing the hexagonal ferrite powder and binder, and then adding the dispersing agent. When employing an aromatic compound as the dispersing agent, from the perspective of promoting alignment in the direction of thickness of the tape of the hexagonal ferrite magnetic particles through the mutual attraction (π-π interaction) of the ring structures contained in the aromatic compound, either (a) or (c) is desirable. Acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methyl cyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbon tetrachloride, chloroform, ethylene chlorohydrin, dichlorobenzene, and other chlorinated hydrocarbons; N,N-dimethylformamide; and hexane can be employed in any ratio as the organic solvent.

ΔM can be kept to a negative value by actively causing the magnetic particles to align in the direction of thickness of the tape, that is, causing them to orient vertically. Thus, the magnetic layer is desirably subjected to vertical orientation processing in the present invention. The state of orientation of the magnetic particles in the magnetic layer is denoted by squareness. In the present invention, the magnetic field is desirably oriented in the vertical direction so that the squareness in the vertical direction without demagnetizing field correction is equal to or greater than 0.65. The upper limit of squareness in the vertical direction is, in principle, 1. From the perspective of achieving a desired ΔM, the squareness is desirably equal to or less than 0.80. The magnetic layer can be formed by coating the magnetic layer coating liquid on the surface being coated and then immediately passing it between magnets with identical poles opposed and simultaneously drying it by blowing hot air. The strength of the magnets, air flow, temperature, and coating rate can be suitably adjusted to form a magnetic layer having squareness in the vertical direction that falls within the desired range.

ΔM—one of the conditions that should be satisfied by the magnetic layer in the present invention—is as set forth above. Another condition in the form of σHk will be described below.

In the magnetic tape of the present invention, the standard deviation σHk of the magnetic anisotropy constant Hk of the magnetic layer is kept to equal to or less than 30%, desirably equal to or less than 15%. That is because when a distribution of Hk is present within the magnetic layer such that σHk exceeds 30%, the noise increases and a good SNR cannot be achieved even when ΔM is controlled by causing the hexagonal ferrite magnetic particles to actively align in the direction of thickness of the tape as set forth above. It is also because an even greater improvement in SNR can be achieved by keeping it to equal to or lower than 15%. The magnetic anisotropy constant Hk is a force that causes the magnetization to face the crystal axis (easily magnetized axis). Its standard deviation σHk indicates the magnetic distribution within the magnetic layer. In the present invention, the term σHk refers to the standard deviation of the magnetic anisotropy constant of the magnetic layer as measured by the method described in Examples further below.

The σHk can be controlled by the switching field distribution SFD and the average plate ratio of the hexagonal ferrite magnetic powder. The higher the average plate ratio, the lower σHk tends to be. The greater the SFD, the more σHk tends to increase. From the perspective of achieving an σHk of equal to or lower than 30%, the average plate ratio of the hexagonal ferrite magnetic powder desirably falls within a range of 2.5 to 5.0, and the SFD desirably falls within a range of 0.1 to 1.2. The smaller the value of σHk, the better from the perspective of enhancing the SNR due to uniform magnetic characteristics in the magnetic layer. Accordingly, the lower limit of σHk is optimally 0%. Taking into account the characteristics of the hexagonal ferrite magnetic particles that are readily available or can be prepared, a practical lower limit can be equal to or more than 10%.

The hexagonal ferrite magnetic powder employed as the ferromagnetic powder in the magnetic layer in the magnetic tape of the present invention will be described next.

Examples of hexagonal ferrite powders are barium ferrite, strontium ferrite, lead ferrite, calcium ferrite, and various substitution products thereof such as Co substitution products. The average plate diameter of the hexagonal ferrite is desirably 10 to 100 nm, preferably 10 to 60 nm, and more preferably, 10 to 30 nm. In particular, when employing a MR head for reproduction to increase the track density, it is desirable to achieve low noise. Thus, the average plate diameter is desirably equal to or less than 60 nm, preferably equal to or less than 50 nm, and more preferably, equal to or less than 30 nm. At less than 10 nm, stable magnetization cannot be expected, and at greater than 100 nm, noise is high, both of which are unsuited to high-density magnetic recording. The average plate thickness is desirably 4 to 15 nm. When the average plate thickness is equal to or greater than 4 nm, stable production is possible. When the average plate thickness is equal to or less than 15 nm, adequate orientation properties can be achieved.

The problems of reduced running durability and stability caused by decreased film strength have conventionally been present in a magnetic layer containing microparticulate hexagonal ferrite of the above-stated particle size. However, improvement can be achieved in these regards in the present invention as set forth above. Thus, good running durability and stability can be achieved in a magnetic tape for high density recording employing microparticulate hexagonal ferrite.

A hexagonal ferrite of high coercive force Hc is advantageous for high-density recording, but this is limited by the capacity of the recording head. The Hc of the hexagonal ferrite employed in the present invention is desirably about 2,000 to about 4,000 Oe, approximately 160 to 320 kA/m. Reference can be made to paragraphs [0003] to [0037] in Japanese Unexamined Patent Publication (KOKAI) No. 2009-54270, for example, for details on the hexagonal ferrite that can be employed in the present invention. The content of the above publication is expressly incorporated herein by reference in its entirety.

The average plate diameter of the hexagonal ferrite powder can be measured by the following method.

Particles of hexagonal ferrite powder are photographed at a magnification of 100,000-fold with a model H-9000 transmission electron microscope made by Hitachi and printed on photographic paper at a total magnification of 500,000-fold to obtain particle photographs. The targeted magnetic material is selected from the particle photographs, the contours of the powder material are traced with a digitizer, and the plate diameter of the particles is measured with KS-400 image analyzer software from Carl Zeiss. The plate diameter of 500 particles is measured. The average value of the plate diameters measured by the above method is adopted as an average plate diameter of the hexagonal ferrite powder.

The size of a powder such as the hexagonal ferrite powder described above (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter).

The magnetic tape of the present invention will be described in greater detail next.

The magnetic layer comprises a binder in addition to the hexagonal ferrite powder. Polyurethane resins, polyester resins, polyamide resins, vinyl chloride resins, acrylic resins in which styrene, acrylonitrile, methyl methacrylate, and the like have been copolymerized, cellulose resins such as nitrocellulose, epoxy resins, phenoxy resins, polyvinyl acetals, polyvinyl butyral, and other polyvinyl alkyrals, can be employed independently or as mixtures of multiple resins as the binder that is contained in the magnetic layer. Of these, the polyurethane resins, acrylic resins, cellulose resins, and vinyl chloride resins are desirable. These resins can also be employed as binders in the nonmagnetic layer and backcoat layer described further below. Reference can be made to paragraphs [0029] to [0031] of Japanese Unexamined Patent Publication (KOKAI) No. 2010-24113, which is expressly incorporated herein by reference in its entirety, with regard to these binders. Polyisocyanate curing agents can be employed with these resins.

Additives can be added as needed to the magnetic layer. Suitable quantities of additives in the form of abrasives, lubricants, dispersing agents, dispersion adjuvants, fungicides, antistatic agents, oxidation inhibitors, solvents, carbon black, and the like can be suitably selected for use based on desired properties from among commercial products and products manufactured by known methods. As the dispersing agent, aromatic compounds set forth above are desirably employed. Reference can be made to paragraph [0033] of Japanese Unexamined Patent Publication (KOKAI) No. 2010-24113 regarding carbon black.

The nonmagnetic layer will be described in detail next. In the magnetic tape of the present invention, a nonmagnetic layer comprising a nonmagnetic powder and a binder can be present between the nonmagnetic support and the magnetic layer. Both inorganic and organic substances can be employed as nonmagnetic powders in the nonmagnetic layer. Carbon black and the like can also be employed. Examples of inorganic substances are metals, metal oxides, metal carbonates, metal sulfates, metal nitrides, metal carbides, and metal sulfides. These nonmagnetic powders are commercially available, and can be manufactured by known methods. Reference can be made to paragraphs [0036] to [0039] of Japanese Unexamined Patent Publication (KOKAI) No. 2010-24113 for details.

The known techniques relating to the magnetic layer can be applied to the binder, lubricants, dispersing agent, additives, solvents, dispersion methods, and the like of the nonmagnetic layer. In particular, known techniques relating to magnetic layers can be applied for the quantity and type of binder, and the types and quantities of additives and dispersing agents added. Reference can be made to paragraphs [0040] to [0042] of Japanese Unexamined Patent Publication (KOKAI) No. 2010-24113, for example, in this regard.

A known film such as a biaxially-oriented polyethylene terephthalate, polyethylene naphthalate, polyamide, polyamideimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. In terms of the surface roughness of the nonmagnetic support that can be employed in the present invention, the support with a center average surface roughness Ra desirably ranges from 3 to 10 nm at a cutoff value of 0.25 mm.

As for the thickness structure of the magnetic recording medium of the present invention, the thickness of the nonmagnetic support preferably ranges from 3 to 80 μm. The thickness of the magnetic layer can be optimized based on the saturation magnetization of the magnetic head employed, the length of the head gap, and the recording signal band, and is normally 10 to 150 nm, preferably 20 to 120 nm, and more preferably, 30 to 100 nm. At least one magnetic layer is sufficient. The magnetic layer may be divided into two or more layers having different magnetic characteristics, and a known configuration relating to multilayered magnetic layer may be applied.

The nonmagnetic layer is, for example, 0.1 to 3.0 μm, preferably 0.3 to 2.0 μm, and more preferably, 0.5 to 1.5 μm in thickness. The nonmagnetic layer of the magnetic tape of the present invention can exhibit its effect so long as it is substantially nonmagnetic. It can exhibit the effect of the present invention, and can be deemed to have essentially the same structure as the magnetic tape of the present invention, for example, even when impurities are contained or a small quantity of magnetic material is intentionally incorporated. The term "essentially the same" means that the residual magnetic flux density of the nonmagnetic layer is equal to or lower than 10 mT, or the coercive force is equal to or lower than 7.96 kA/m (equal to or lower than 100 Oe), with desirably no residual magnetic flux density or coercive force being present.

A backcoat layer can be provided on the opposite surface of the nonmagnetic support from the surface on which the magnetic layer is present in the magnetic tape of the present invention. Carbon black and an inorganic powder are desirably incorporated into the backcoat layer. The formula of the magnetic layer and nonmagnetic layer can be employed for the binder and various additives for forming the backcoat layer. The backcoat layer is desirably equal to or less than 0.9 μm, preferably 0.1 to 0.7 μm, in thickness.

The process for manufacturing magnetic layer, nonmagnetic layer and backcoat layer coating liquids normally comprises at least a kneading step, a dispersing step, and a mixing step to be carried out, if necessary, before and/or after the kneading and dispersing steps. Each of the individual steps may be divided into two or more stages. All of the materials employed in the present invention may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. The order of addition of the hexagonal ferrite powder, binder, and the dispersing agent described above in the preparation of the magnetic layer coating liquid is as set forth above.

To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274, which are expressly incorporated herein by reference in their entirety. Further, glass beads may be employed to disperse the magnetic layer, nonmagnetic layer and backcoat layer coating liquids. Dispersing media with a high specific gravity such as zirconia beads, titania beads, and steel beads are also suitable for use. The particle diameter and filling rate of these dispersing media can be optimized for use. A known dispersing device may be employed. As set forth above, from the perspective of readily achieving a desired ΔM in the present invention, the dispersed particle diameter of the hexagonal ferrite in the magnetic layer coating liquid is desirably controlled within the above-stated range by the dispersion processing. Reference can be made to paragraphs [0051] to [0057] in Japanese Unexamined Patent Publication (KOKAI) No. 2010-24113 for details of the method of manufacturing a magnetic tape.

The magnetic tape of the present invention as set forth above can be employed in a magnetic recording system of the vertical recording type in which magnetic particles are magnetized in the direction of thickness of the tape, or employed in a magnetic recording system of the longitudinal recording type in which the magnetic particles are magnetized in the longitudinal direction. A particularly pronounced increase in the SNR can be exhibited in recording systems of the longitudinal recording type. That is presumed to be because when hexagonal ferrite magnetic particles stack in the direction of thickness of the tape, the magnetic interaction between the particles decreases in the longitudinal direction of the tape, and spreading of noise components during recording decreases in the longitudinal direction in particular. Accordingly, the magnetic tape of the present invention is suitable as a longitudinal recording-use magnetic tape. Accordingly, a further aspect of the present invention relates to a magnetic recording device comprising the magnetic tape of the present invention and a longitudinal recording magnetic head.

The magnetic head that records on the magnetic tape of the present invention by a longitudinal recording method (longitudinal recording magnetic head) need only be one that is capable of magnetizing the hexagonal ferrite magnetic particles contained in the magnetic layer in the longitudinal direction. Specific examples are ring inductive heads and inductive thin-film heads equipped with upper and lower magnetic poles. A high-sensitivity MR head is desirably employed as the reproduction head.

EXAMPLES

The present invention will be described in detail below based on Examples. However, the present invention is not limited to the examples. The "parts" and "%" given in Examples are weight parts and weight % unless specifically stated otherwise.

1. Examples and Comparative Examples of the Magnetic Tape 1-1. Magnetic Layer Coating Liquid Formula Ferromagnetic platelike hexagonal ferrite powder: 100 parts
 (Particle size and SFD characteristic thereof are shown in Table 1.)
Polyurethane resin (functional group: —$SO_3Na$, functional
 group concentration: 180 eq/t): 14 parts
2,3-Dihydroxynaphthalene or biphenyl benzoic acid (see Table 1): 6 parts
Alumina powder (average particle diameter: 120 nm): 50 parts
Colloidal silica (particle size: 100 nm): 20 parts
Cyclohexanone: 110 parts
Methyl ethyl ketone: 100 parts
Toluene: 100 parts
Butyl stearate: 2 parts
Stearic acid: 1 part 1-2. Nonmagnetic Layer Coating Liquid Formula Nonmagnetic inorganic powder (α-iron oxide): 85 parts
Surface treatment agents: $Al_2O_3$, $SiO_2$
Major axis diameter: 0.05 μm
Tap density: 0.8
Acicular ratio: 7
Specific surface area by BET method: 52 $m^2/g$
pH: 8
DBP oil absorption capacity: 33 g/100 g
Carbon black: 20 parts
DBP oil absorption capacity: 120 mL/100 g
pH: 8
Specific surface area by BET method: 250 $m^2/g$
Volatile component: 1.5%
Polyurethane resin (functional group: —$SO_3Na$, functional
 group concentration: 180 eq/t): 15 parts
Phenyl phosphonic acid: 3 parts
α-$Al_2O_3$ (average particle diameter 0.2 μm): 10 parts
Cyclohexanone: 140 parts
Methyl ethyl ketone: 170 parts
Butyl stearate: 2 parts
Stearic acid: 1 part 1-3. Preparation of Magnetic Tape For each of the above coating liquids, the various components were kneaded for 60 minutes in an open kneader and then dispersed for 720 minutes or 1,080 minutes (see Table 1) in a sand mill employing zirconia beads (particle diameter:

0.5 mm). To the dispersions obtained were added 6 parts of trifunctional low-molecular-weight polyisocyanate compound (Coronate 3041 made by Nippon Polyurethane Industry Co., Ltd.). The mixtures were mixed by stirring for another 20 minutes and filtered using a filter having an average pore diameter of 1 μm to prepare a magnetic layer coating liquid and nonmagnetic layer coating liquid.

The nonmagnetic layer coating liquid was coated in a quantity calculated to yield a dry thickness of 1.5 μm on a polyethylene naphthalate base 5 μm in thickness and dried at 100° C. Immediately thereafter, the magnetic layer coating liquid was wet-on-dry coated in a quantity calculated to yield a dry thickness of 0.08 μm and dried at 100° C. Then, before the magnetic layer had fully dried, vertical magnetic field orientation was conducted with 300 mT (3,000 gauss) magnets. After conducting a surface-smoothing treatment at 90° C. and a linear pressure of 300 kg/cm at a rate of 100 m/min with a seven-stage calender comprised only of metal roles, a heat-curing treatment was conducted for 24 hours at 70° C. and the product was slit to ½ inch width to prepare a magnetic tape.

2. Evaluation of the Hexagonal Ferrite Powder and Magnetic Tape 2-1. Measurement of the SFD of the Hexagonal Ferrite Powder Measurement was conducted at an applied magnetic field of 796 kA/m (10 kOe) at 23° C. with a vibrating sample flux meter (made by Toei-Kogyo Co., Ltd.).

2-2. Measurement of the Size of the Hexagonal Ferrite Powder

Measurement was conducted by the above-described method with a model H-9000 transmission electron microscope made by Hitachi.

2-3. Evaluation of Position Error Signal (PES)

The tape was run using a reel tester and a servo signal was picked up from the tape for analysis with a digital storage oscilloscope to determine the amount of vertical tape movement at which a magnetic recording head of the LTO G5 standard could no longer track. The PES as measured by the above method was affected by running stability and the SNR. A measurement value of equal to or more than 100 nm was considered inadequate in terms of practical running stability.

2-4. Evaluation of Running Durability (Output Drop)

Using a reel tester, the output on the first pass of a running tape and the output of the tape after making 10,000 back and forth passes were measured with a spectral analyzer and the difference was calculated. A value of equal to or lower than −3 dB as calculated by the above method was considered to indicate inadequate practical running durability.

2-5. SNR

Using a reel tester, a signal was recorded at a recording density of 250 kfci and reproduced in the longitudinal direction of the tape using a read head (track width 1 μm, gap 200 nm) and write head (Bs=1.8 T), after which the reproduction signal from the tape and the noise spectrum were measured with a spectral analyzer and the ratio of the reproduction signal to the noise (SNR) was calculated. A value of the SNR as calculated by the above method of greater than 0 dB was considered to indicate good electromagnetic characteristics.

2-6. Dispersed Particle Diameter

To evaluate the dispersion state of hexagonal ferrite magnetic particles in the magnetic layer coating liquid, a portion of the magnetic layer coating liquid prepared by the above method was collected and diluted to 1/50 by weight with the same organic solvent that was employed to prepare the coating liquids to prepare a sample solution. The sample solution prepared was measured with an LB500 light scattering particle size distribution analyzer (made by Horiba) and the arithmetic average particle diameter was adopted as the dispersed particle diameter.

2-7. Squareness

A vibrating sample flux meter (VSM) was employed to measure the squareness in the vertical direction (vertical SQ) at an external magnetic field of 1,194 kA/m (15 kOe) of the magnetic layer of each of the magnetic tapes prepared.

2.8. Magnetic interaction ΔM

A vibrating sample flux meter (VSM) was employed to measure the residual magnetization Id (H) with DC demagnetization, the residual magnetization Ir (H) with AC demagnetization, and the residual magnetization Ir (∞) at an applied magnetic field of 796 kA/m (10 kOe) of each of the magnetic tapes prepared, and ΔM was calculated from equation (1) set forth above.

2-9. Standard Deviation σHk of Magnetic Anisotropy Constant Hk

A TRT-2 magnetic torque meter made by Toei-Kogyo Co., Ltd. was employed to measure the value of the rotational hysteresis loss Wr from a low magnetic field of the demagnetized magnetic tape. Measurement was conducted to 10 kOe. This value was plotted relative to the inverse 1/H of the applied magnetic field, and on the high applied magnetic field side, the magnetic field at which Wr went to 0 was obtained by extrapolating the linear portion of the Wr curve and adopted as Hk. The standard deviation σHk was calculated from the measured values.

2-10. Filling Rate of the Magnetic Layer

The σs (unit: emu/g) of powder from the same lot as the ferromagnetic platelike hexagonal ferrite powder employed in the magnetic layer was measured with a vibrating sample flux meter (VSM) and the as (unit: emu/cm$^3$) was calculated from the density (g/cm$^3$) of the same powder.

Separately, the thickness (unit: cm) of each of the tapes prepared in Examples and Comparative Examples was calculated from a transmission electron microscope (TEM) image. The value of emu/cm$^2$ was calculated as the as (unit: emu/cm$^3$)×thickness (unit: cm). The filling rate was calculated from the ratio of the value obtained to φm (unit: emu/cm$^2$) obtained from the tape VSM measurement.

The above results are given in Table 1.

TABLE 1

| | Average plate diameter of barium ferrite | Average plate ratio of barium ferrite | SFD of barium ferrite | Dispersion condition of magnetic layer coating liquid (type of dispersing agent, dispersion time) Diameter of beads 0.5 mm φ | Dispersed particle diameter in magnetic layer coating liquid |
|---|---|---|---|---|---|
| Ex. 1 | 21 nm | 3.5 | 0.50 | Dihydroxynaphthalene 720 minutes | 25 nm |
| Ex. 2 | 20 nm | 3.2 | 0.95 | Biphenyl benzoic acid 720 minutes | 32 nm |

TABLE 1-continued

| | | | | | |
|---|---|---|---|---|---|
| Ex. 3 | 19 nm | 3.0 | 0.10 | Dihydroxynaphthalene 720 minutes | 25 nm |
| Ex. 4 | 22 nm | 4.5 | 0.45 | Dihydroxynaphthalene 720 minutes | 23 nm |
| Ex. 5 | 21 nm | 3.6 | 0.85 | Dihydroxynaphthalene 720 minutes | 32 nm |
| Ex. 6 | 19 nm | 3.0 | 0.95 | Biphenyl benzoic acid 720 minutes | 25 nm |
| Ex. 7 | 21 nm | 3.5 | 0.50 | Dihydroxynaphthalene 720 minutes | 20 nm |
| Ex. 8 | 20 nm | 3.3 | 0.45 | Dihydroxynaphthalene 720 minutes | 35 nm |
| Ex. 9 | 21 nm | 3.5 | 0.10 | Dihydroxynaphthalene 720 minutes | 25 nm |
| Comp. Ex. 1 | 20 nm | 3.3 | 0.45 | Dihydroxynaphthalene 720 minutes | 32 nm |
| Comp. Ex. 2 | 18 nm | 2.4 | 0.55 | Biphenyl benzoic acid 720 minutes | 20 nm |
| Comp. Ex. 3 | 21 nm | 4.0 | 0.55 | Dihydroxynaphthalene 720 minutes | 25 nm |
| Comp. Ex. 4 | 22 nm | 4.6 | 0.20 | Dihydroxynaphthalene 720 minutes | 35 nm |
| Comp. Ex. 5 | 22 nm | 4.2 | 0.15 | Dihydroxynaphthalene 720 minutes | 20 nm |
| Comp. Ex. 6 | 21 nm | 3.5 | 0.50 | No dispersing agent was employed. | 51 nm |
| Comp. Ex. 7 | 21 nm | 3.5 | 0.50 | Dihydroxynaphthalene 1080 minutes | 18 nm |

| | Vertical SQ of magnetic layer | Filling rate of magnetic layer | Magnetic characteristics of magnetic layer ($\Delta M$, $\sigma Hk$) | |
|---|---|---|---|---|
| Ex. 1 | 0.70 | 45% | $\sigma Hk$ | 20% |
| | | | $\Delta M$ | −0.08 |
| Ex. 2 | 0.65 | 45% | $\sigma Hk$ | 28% |
| | | | $\Delta M$ | −0.04 |
| Ex. 3 | 0.70 | 30% | $\sigma Hk$ | 10% |
| | | | $\Delta M$ | −0.04 |
| Ex. 4 | 0.80 | 40% | $\sigma Hk$ | 10% |
| | | | $\Delta M$ | −0.15 |
| Ex. 5 | 0.68 | 60% | $\sigma Hk$ | 28% |
| | | | $\Delta M$ | −0.15 |
| Ex. 6 | 0.65 | 50% | $\sigma Hk$ | 30% |
| | | | $\Delta M$ | −0.08 |
| Ex. 7 | 0.70 | 60% | $\sigma Hk$ | 20% |
| | | | $\Delta M$ | −0.20 |
| Ex. 8 | 0.65 | 45% | $\sigma Hk$ | 20% |
| | | | $\Delta M$ | −0.03 |
| Ex. 9 | 0.75 | 45% | $\sigma Hk$ | 15% |
| | | | $\Delta M$ | −0.10 |
| Comp. Ex. 1 | 0.63 | 40% | $\sigma Hk$ | 20% |
| | | | $\Delta M$ | −0.02 |
| Comp. Ex. 2 | 0.65 | 50% | $\sigma Hk$ | 32% |
| | | | $\Delta M$ | −0.08 |
| Comp. Ex. 3 | 0.72 | 65% | $\sigma Hk$ | 20% |
| | | | $\Delta M$ | −0.21 |
| Comp. Ex. 4 | 0.60 | 45% | $\sigma Hk$ | 10% |
| | | | $\Delta M$ | −0.02 |
| Comp. Ex. 5 | 0.85 | 55% | $\sigma Hk$ | 10% |
| | | | $\Delta M$ | −0.21 |
| Comp. Ex. 6 | 0.58 | 50% | $\sigma Hk$ | 20% |
| | | | $\Delta M$ | −0.01 |
| Comp. Ex. 7 | 0.75 | 45% | $\sigma Hk$ | 20% |
| | | | $\Delta M$ | −0.21 |

| | ①PES LTO-G5 drive PES | ②Durability Output drop after LTO-G5 100 ffp | ③SNR 250 kfci |
|---|---|---|---|
| Ex. 1 | 40 nm | −0.7 dB | +3.5 dB |
| Ex. 2 | 50 nm | −1.0 dB | +3.0 dB |
| Ex. 3 | 35 nm | −0.5 dB | 5.0 dB |
| Ex. 4 | 20 nm | 0 dB | +4.0 dB |
| Ex. 5 | 35 nm | −0.5 dB | +3.5 dB |
| Ex. 6 | 45 nm | −1.0 dB | +2.5 dB |
| Ex. 7 | 20 nm | 0 dB | +1.0 dB |
| Ex. 8 | 60 nm | −1.5 dB | +4.0 dB |
| Ex. 9 | 30 nm | −0.5 dB | +4.0 dB |
| Comp. Ex. 1 | 100 nm | −3.0 dB | +4.0 dB |
| Comp. Ex. 2 | 50 nm | −1.0 dB | 0 dB |

TABLE 1-continued

| Comp. Ex. 3 | 30 nm  | −0.3 dB | 0 dB    |
|-------------|--------|---------|---------|
| Comp. Ex. 4 | 50 nm  | −4.0 dB | +5.0 dB |
| Comp. Ex. 5 | 20 nm  | 0 dB    | 0 dB    |
| Comp. Ex. 6 | 110 nm | −3.5 dB | +4.5 dB |
| Comp. Ex. 7 | 30 nm  | −0.3 dB | 0 dB    |

Evaluation Results

As indicated in Table 1, the magnetic tapes of Examples 1 to 8, in which the σHk of the magnetic layer was equal to or lower than 30% and ΔM fell within a range of −0.20≤ΔM≤−0.03, exhibited good electromagnetic characteristics as well as running durability and stability that were adequate in practical terms. Particularly good electromagnetic characteristics, running durability, and stability were exhibited in the embodiments in which the σHk of the magnetic layer was equal to or lower than 15%, ΔM fell within a range of −0.20≤ΔM≤−0.10, and the average plate diameter of the hexagonal ferrite magnetic powder contained in the magnetic layer fell within a range of 10 to 30 nm.

The magnetic tape of the present invention is suitable as a data backup tape that is required to exhibit high reliability and good electromagnetic characteristics over an extended period.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape comprising a magnetic layer containing a hexagonal ferrite magnetic powder and a binder on a non-magnetic support, wherein:

the hexagonal ferrite magnetic powder has an average plate ratio ranging from 2.5 to 5.0, a switching field distribution SFD ranging from 0.1 to 1.2, and an average plate diameter ranging from 10 to 50 nm, the standard deviation σHk of the magnetic anisotropy constant Hk of the magnetic layer is equal to or less than 30%, and the magnetic interaction ΔM as calculated by equation (1) below falls within a range of −0.20≤ΔM≤−0.03:

$$\Delta M = (Id(H) + 2Ir(H) - Ir(\infty))/Ir(\infty) \quad (1)$$

wherein Id(H) denotes a residual magnetization measured with DC demagnetization, Ir(H) denotes a residual magnetization measured with AC demagnetization, and Ir(∞) denotes a residual magnetization measured at an applied magnetic field of 796 kA/m (10 kOe).

2. The magnetic tape according to claim 1, which is a longitudinal recording magnetic tape.

3. The magnetic tape according to claim 1, which further comprises a dispersing agent in the form of an aromatic compound comprising at least one polar group selected from the group consisting of a carboxyl group and a hydroxyl group.

4. The magnetic tape according to claim 3, wherein the aromatic compound comprises an aromatic ring directly substituted with the polar group.

5. The magnetic tape according to claim 3, wherein the aromatic compound is selected from the group consisting of dihydroxynaphthalene and biphenyl benzoic acid.

6. The magnetic tape according to claim 1, wherein the standard deviation σHk of the magnetic anisotropy constant Hk of the magnetic layer is equal to or less than 15%.

7. The magnetic tape according to claim 1, wherein the magnetic interaction ΔM of the magnetic layer falls within a range of −0.20<ΔM<−0.10.

8. The magnetic tape according to claim 1, wherein the magnetic layer comprises a hexagonal ferrite magnetic powder with an average plate diameter ranging from 10 nm to 30 nm.

9. The magnetic tape according to claim 6, wherein the magnetic interaction ΔM of the magnetic layer falls within a range of −0.20≤ΔM≤−0.10, and the magnetic layer comprises a hexagonal ferrite magnetic powder with an average plate diameter ranging from 10 nm to 30 nm.

10. The magnetic tape according to claim 5, wherein the standard deviation σHk of the magnetic anisotropy constant Hk of the magnetic layer is equal to or less than 15%, the magnetic interaction ΔM of the magnetic layer falls within a range of −0.20≤ΔM ≤−0.10, and the magnetic layer comprises a hexagonal ferrite magnetic powder with an average plate diameter ranging from 10 nm to 30 nm.

11. A magnetic recording device, which comprises a magnetic tape and a magnetic head, wherein the magnetic head is a longitudinal recording magnetic head, and the magnetic tape is the magnetic tape according to claim 1.

12. The magnetic recording device according to claim 11, wherein the magnetic layer in the magnetic tape further comprises a dispersing agent in the form of an aromatic compound comprising at least one polar group selected from the group consisting of a carboxyl group and a hydroxyl group.

13. The magnetic recording device according to claim 12, wherein the aromatic compound comprises an aromatic ring directly substituted with the polar group.

14. The magnetic recording device according to claim 12, wherein the aromatic compound is selected from the group consisting of dihydroxynaphthalene and biphenyl benzoic acid.

15. The magnetic recording device according to claim 11, wherein the standard deviation σHk of the magnetic anisotropy constant Hk of the magnetic layer in the magnetic tape is equal to or less than 15%.

16. The magnetic recording device according to claim 11, wherein the magnetic interaction ΔM of the magnetic layer falls within a range of $-0.20 \leq \Delta M \leq -0.10$.

17. The magnetic recording device according to claim 11, wherein the magnetic layer in the magnetic tape comprises a hexagonal ferrite magnetic powder with an average plate diameter ranging from 10 nm to 30 nm.

18. The magnetic recording device according to claim 15, wherein the magnetic interaction ΔM of the magnetic layer falls within a range of $-0.20 \leq \Delta M \leq -0.10$, and the magnetic layer in the magnetic tape comprises a hexagonal ferrite magnetic powder with an average plate diameter ranging from 10 nm to 30 nm.

19. The magnetic recording device according to claim 14, wherein the standard deviation σHk of the magnetic anisotropy constant Hk of the magnetic layer in the magnetic tape is equal to or less than 15%, the magnetic interaction ΔM of the magnetic layer falls within a range of $-0.20 \leq \Delta M \leq -0.10$, and the magnetic layer in the magnetic tape comprises a hexagonal ferrite magnetic powder with an average plate diameter ranging from 10nm to 30 nm.

20. The magnetic tape according to claim 1, wherein the hexagonal ferrite magnetic powder has an average plate ratio ranging from 3.2 to 5.0.

\* \* \* \* \*